(No Model.)
C. D. GAMMON.
DECOY DUCK.
No. 390,587. Patented Oct. 2, 1888.
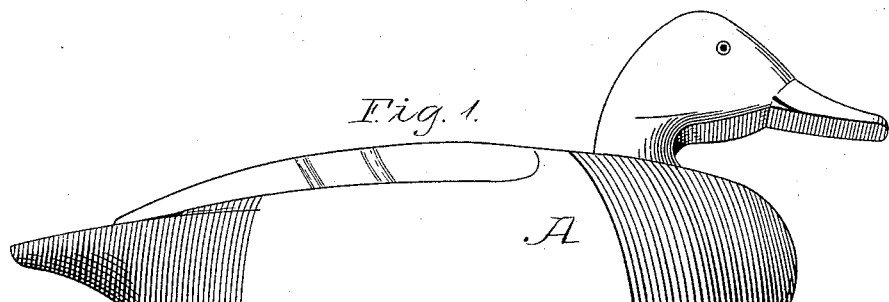
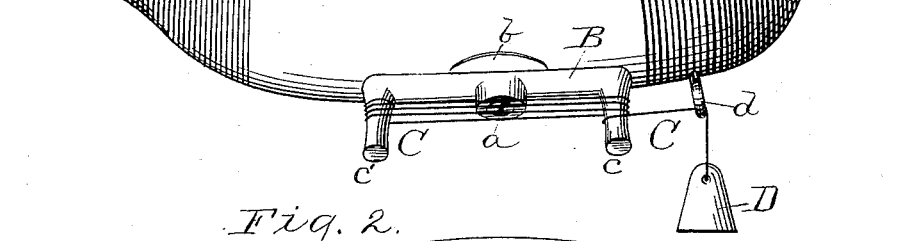
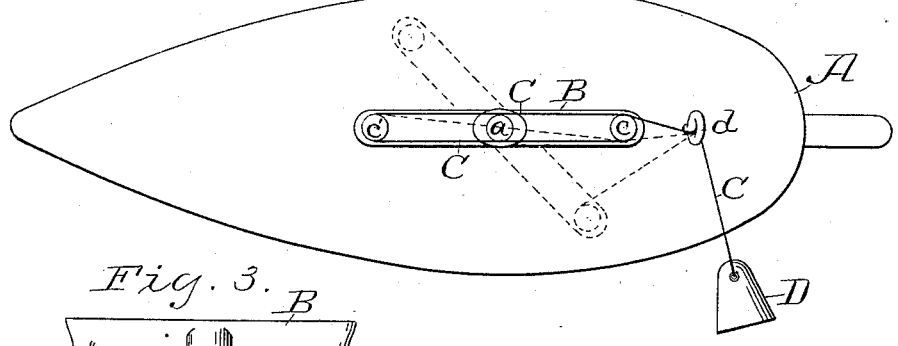
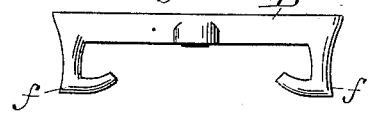
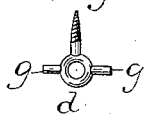
Charles D. Gammon
Inventor
Witnesses
Minnie E. Coyne
Robert J. Coyne
By his Attorney
Frank D. Thomason

UNITED STATES PATENT OFFICE.

CHARLES D. GAMMON, OF CHICAGO, ILLINOIS, ASSIGNOR OF ONE-HALF TO HENRY D. NICHOLLS, OF SAME PLACE.

DECOY-DUCK.

SPECIFICATION forming part of Letters Patent No. 390,587, dated October 2, 1888.

Application filed January 17, 1888. Serial No. 261,061. (No model.)

*To all whom it may concern:*

Be it known that I, CHARLES D. GAMMON, of Chicago, Cook county, Illinois, have invented certain new and useful Improvements in Decoy-Ducks, of which the following is a full, clear, and exact description, reference being had to the accompanying drawings and letters of reference marked thereon.

Heretofore decoy-ducks have been anchored principally by means of anchor-cord of sufficient length suitably fastened to the body and having a weight attached to its free end, which was thrown overboard and sunk to the bottom of the body of water in which said decoy was floated. The length of the anchor-cord was such that when said decoy was floated in deep water—say about twenty feet deep—the weight on its free end would sink to the bottom. The same length of cord was payed out when floating the decoy in water not more than two feet deep, because if it were attempted to wind the cord about the body of the decoy the unusual sight would frighten away the game. This great length of cord in shallow water enabled the decoy to float a considerable distance away from where a hunter considered it was best situated to attract game, and was objectionable for that reason. Another objection was encountered when taking the decoys out of the water when it was necessary to wind the wet anchor-cord with a double loop, (like the figure 8,) about the head and tail of the decoy and running the hawser through the hand when so winding it, much to the inconvenience and discomfiture of the person performing the operation. I avoid all of these objections, and many others which readily suggest themselves to old duck-hunters, by providing a combined reel and weight for the decoy, substantially as hereinafter fully described, and as illustrated in the drawings, in which—

Figure 1 is a perspective view of a decoy-duck, showing my improvements applied thereto. Fig. 2 is a view of the under side thereof; and Figs. 3, 4, and 5 show modified details of the same.

Referring to the drawings, A represents a decoy-duck having a stud, $a$, projecting down from a plate, $b$, suitably secured to the belly of the decoy, preferably about its center of length. Journaled about at its center of length on this stud $a$ is a reel, B, consisting of a bar having downwardly-projecting pins $c$ $c'$ on its ends. Fastened at one end to one of these pins is an anchor-cord, C, which, passing through the eye $d$, secured to the breast of the decoy in longitudinal alignment with the center of revolution of said reel B, has a weight, D, secured to its free end. By inverting the decoy and catching hold of either pin $c$ or $c'$ the reel can be revolved so as to wind the anchor-cord C upon said pins, and when said cord has been sufficiently wound thereon it can be prevented from independently unwinding by simply lifting said twine over the end of the pin nearest eye $d$, so that it falls on the wrong side thereof, thus preventing the reel from revolving farther in the direction it was last turning and preventing the reel revolving in the reverse direction to unwind the cord more than would be caused by one-half of a revolution, substantially as shown in Fig. 2 by dotted lines.

By placing the reel on the under side or belly of the decoy I avoid the necessity of weighting the same, as is now done in order to keep it upright in the water. Moreover, as the reel depends below the body of the duck it is much more effective in righting the same than the old weighting arrangement.

I do not wish to be confined to the exact form of reel above described, because it is obvious it could be cylindrical or spool-shaped, as shown by E in Fig. 4, and could have pins $e$ $e$ project from its lower face, around which the anchor-cord could be looped to prevent further revolution, the same as shown in Figs. 1 and 2. Instead of the reel shown in Fig. 4 revolving horizontally, its axis might be horizontal. I prefer, however, the reel first described.

While I prefer to have the cord after it leaves the reel pass through the eye $d$, or a device serving a similar purpose, I could dispense with it, and instead make hooks $f$ $f$ depend from the ends of the reel B, (shown in Fig. 3,) or hooks $e'$ project from the lower face of the reel shown in Fig. 4. In case I used reels having such hooks to prevent the hawser unwinding therefrom, I loop it and slip said loop over the hook, which prevents the loop slipping off and said cord from unwinding.

I could, if desirable, dispense with the pins $c$ or $c'$, or hooks $f$ or $e'$ on the reels by constructing the eye $d$ with lateral projections $g$, as shown in Fig. 5, so that to prevent further winding or unwinding the cord could be given a double loop over said projections.

What I claim as new is—

1. The combination, with a decoy-duck, of a reel journaled to the under side thereof, and a cord wound upon said reel, having a weight attached to its free end, and said weight.

2. The combination, with a decoy-duck, of a reel journaled to the under side thereof, pins projecting downward from the same, a cord, and a weight attached to said hawser, as set forth.

3. The combination, with a decoy-duck, of a reel journaled to the under side thereof, consisting of a straight bar, pins projecting downward from the ends thereof, a cord, and a weight attached to the end of the same.

4. The combination, with a decoy-duck, of a reel, a cord wound thereon, a weight attached to the end of said cord, and an eye secured to the body of the duck, through which said cord passes, as set forth.

CHARLES D. GAMMON.

In presence of—
FRANK D. THOMASON,
MINNIE E. COYNE.